US00RE34038E

United States Patent [19]

Bennett et al.

[11] E Patent Number: Re. 34,038

[45] Reissued Date of Patent: Aug. 25, 1992

[54] SEPARATING ARGON/OXYGEN MIXTURES USING A STRUCTURED PACKING

[75] Inventors: Douglas L. Bennett, Allentown; Keith A. Ludwig, Emmaus; George S. Witmer, Macungie; Charles M. Woods, Germansville, all of Pa.

[73] Assignee: Air Products and Chemicals, Inc., Allentown, Pa.

[21] Appl. No.: 708,948

[22] Filed: May 31, 1991

Related U.S. Patent Documents

Reissue of:

[64] Patent No.: 4,836,836
Issued: Jun. 6, 1989
Appl. No.: 132,535
Filed: Dec. 14, 1987

[51] Int. Cl.[5] ..... F25J 3/04

[52] U.S. Cl. ..... 62/22; 62/31; 62/34

[58] Field of Search ..... 62/9, 11, 17, 18, 20, 62/22, 23, 24, 31, 32, 34; 261/94, 95

[56] References Cited

U.S. PATENT DOCUMENTS

| | | | |
|---|---|---|---|
| 3,173,778 | 3/1965 | Gaumer, Jr. | 62/18 |
| 3,254,497 | 6/1966 | Henry et al. | 62/18 |
| 3,729,943 | 5/1973 | Petit | 62/22 |
| 4,088,464 | 9/1978 | Bigi | 62/22 |
| 4,128,684 | 12/1978 | Bomio et al. | 428/175 |
| 4,186,159 | 1/1980 | Huber | 261/112 |
| 4,296,050 | 10/1981 | Meier | 261/112 |
| 4,455,339 | 6/1984 | Meier | 428/185 |
| 4,497,751 | 2/1985 | Pluss | 261/94 |
| 4,497,752 | 2/1985 | Huber | 261/95 |
| 4,497,753 | 2/1985 | Streiff | 261/95 |
| 4,533,375 | 8/1985 | Erickson | 62/22 |
| 4,578,095 | 3/1986 | Erickson | 62/22 |
| 4,604,116 | 8/1986 | Erickson | 62/13 |
| 4,605,427 | 8/1986 | Erickson | 62/22 |
| 4,670,031 | 6/1987 | Erickson | 62/22 |
| 4,737,177 | 12/1988 | Erickson | 62/22 |

OTHER PUBLICATIONS

V. P. Alekseev et al., "Packed Columns for Air Rectification: Advantages of Regular Shaped Packing", 1983.

J. L. Bravo et al., "Mass Transfer in Gauze Packing", Hydrocarbon Processing, Jan. 1985.

*Primary Examiner*—Ronald C. Capossela

*Attorney, Agent, or Firm*—Willard Jones, II; William F. Marsh; James C. Simmons

[57] ABSTRACT

The present invention relates to improvements to a process and apparatus for the cryogenic distillation of mixtures, which comprise oxygen, nitrogen and argon, e.g. air. The improvement comprises effectuating intimate contact of the liquid and vapor phase streams utilizing a structured packing to effectuate the intimate contact in at least [those] *one of the* regions of the distillation column system where argon concentration is within the range from about 0.6 to about 75 volume percent[,] and [operating the process such that] the densimetric superficial gas velocity [in those regions] is at least 0.06 feet per second. [The present invention also relates to a method for improving a cryogenic distillation apparatus having at least one distillation column for the separation of mixtures containing oxygen and argon, comprising the step of replacing the distillation trays with a structured packing in at least those regions of the distillation column system where the concentration of argon is in the range from about 0.6 to about 75 volume percent.] *The present invention also relates to the use of structured packing to reduce the HETP (height of packing equivalent to a theoretical plate) in a region of a distillation column system separating oxygen and argon by intimately contacting a liquid phase stream containing oxygem and argon, and a vapor phase stream containing oxygen and argon at an argon concentration within the range from 0.6 to 75 volume percent and a densimetric superficial gas velocity of at least 0.06 feet per second.*

14 Claims, 3 Drawing Sheets

SEPARATING ARGON/OXYGEN MIXTURES USING A STRUCTURED PACKING

Matter enclosed in heavy brackets [ ] appears in the original patent but forms no part of this reissue specification; matter printed in italics indicates the additions made by reissue.

TECHNICAL FIELD

The present invention relates to a process and apparatus for the separation of mixtures comprising nitrogen, oxygen and argon by cryogenic distillation. More specifically, the present invention relates to the use of a structured packing in the cryogenic distillation where argon is present in concentrations between 0.6 and 75 vol %.

BACKGROUND OF THE INVENTION

Numerous processes are known for the separation of air by cryogenic distillation into its constituent components, representative among these are U.S. Pat. Nos. 3,729,943; 4,533,375, 4,578,095; 4,604,116; 4,605,427 and 4,670,031.

In addition, examples of structured or ordered packings are known in the art, representative among these are U.S. Pat. Nos. [4,128,684;] 4,186,159; 4,296,050; 4,455,339; 4,497,751; 4,497,752 and 4,497,753.

SUMMARY OF THE INVENTION

The present invention relates an improvement to *a process for the separation of mixtures, which comprise oxygen and argon, by cryogenic distillation. Wherein, in a distillation column system having at least one column, a liquid phase stream containing oxygen and argon and a vapor phase stream containing oxygen and argon are intimately contacted in at least one region of the distillation column system where argon concentration is within the range from 0.6 to 75 volume percent, thereby allowing mass transfer which enriches the liquid phase stream with oxygen and strips argon from the liquid phase stream, and enriches the vapor phase stream with argon and strips oxygen from the vapor phase stream. The improvement is characterized in that intimate contact of said liquid and vapor phase streams in said region is effected utilizing a structured packing and the densimetric superficial gas velocity in said region is at least 0.06 feet per second (1.8 cm/sec).* [a process for the separation of mixtures, which comprise oxygen, nitrogen, and argon, (e.g. air) by cryogenic distillation, wherein in certain regions of a distillation column system having at least one column, a liquid phase stream containing oxygen, argon and nitrogen, are intimately contacted thereby allowing mass transfer which enriches the liquid phase stream with oxygen and strips argon from the liquid phase stream, and enriches the vapor phase stream with argon and strips oxygen from the vapor phase stream. The improvement comprises effectuating intimate contact of the liquid and vapor phase streams utilizing a structured packing in at least those regions of the distillation column system where argon concentration is within the range from about 0.6 to about 75 volume percent, and operating the process such that the densimetric superficial gas velocity in those regions is at least 0.06 feet per second.]

The process of the present invention is also applicable to separate mixtures that [do not] contain nitrogen.

*The present invention is particularly applicable to the separation of air.*

*In the process of the present invention, there can be more than one region having said argon concentration and all of said regions can utilize structured packing and operate within said densimetric superficial gas velocity range.*

[The present invention also relates to a method for improving a cryogenic distillation apparatus having at least one distillation column for the separation of mixtures containing oxygen and argon, comprising the step of replacing the distillation trays with a structured packing in at least those regions of the distillation column system where the concentration of argon is in the range from about 0.6 to about 75 volume percent.]

*The present invention also relates to the use of structured packing to reduce the HETP (height of packing equivalent to a theoretical plate) in a region of a distillation column system separating oxygen and argon by intimately contacting a liquid phase stream containing oxygen and argon, and a vapor phase stream containing oxygen and argon at an argon concentration within the range from 0.6 to 75 volume percent and a densimetric superficial gas velocity of at least 0.06 feet per second.*

DETAILED DESCRIPTION OF THE INVENTION

The present invention relates to an improvement to a process and apparatus for the separation of mixtures comprising oxygen, nitrogen and argon, e.g. air, by cryogenic distillation. The invention is also applicable to mixtures which do not comprise nitrogen. Essentially, the improvement of the present invention is the use of a [structures] *structured* packing in place of distillation trays in at least those regions of the distillation column system where the argon content will be in the range of about 0.6 to about 75 volume percent and where the densitmetric superficial gas velocity is at least 0.06 ft/sec.

For example, the cryogenic separation of air to produce nitrogen, oxygen and argon products is usually carried out in a three column distillation system. These three columns are called the high pressure column, the low pressure column and the argon column. Examples of air separation processes which separate argon and oxygen and produce both as products are shown in U.S. Pat. Nos. 3,729,943; 4,533,375; 4,578,095; 4,604,116; 4,605,427 and 4,670,031, the specifications of which are incorporated herein by reference. A flow sheet for a typical air separation process producing oxygen and argon products is illustrated in FIG. 1.

Figure 1:
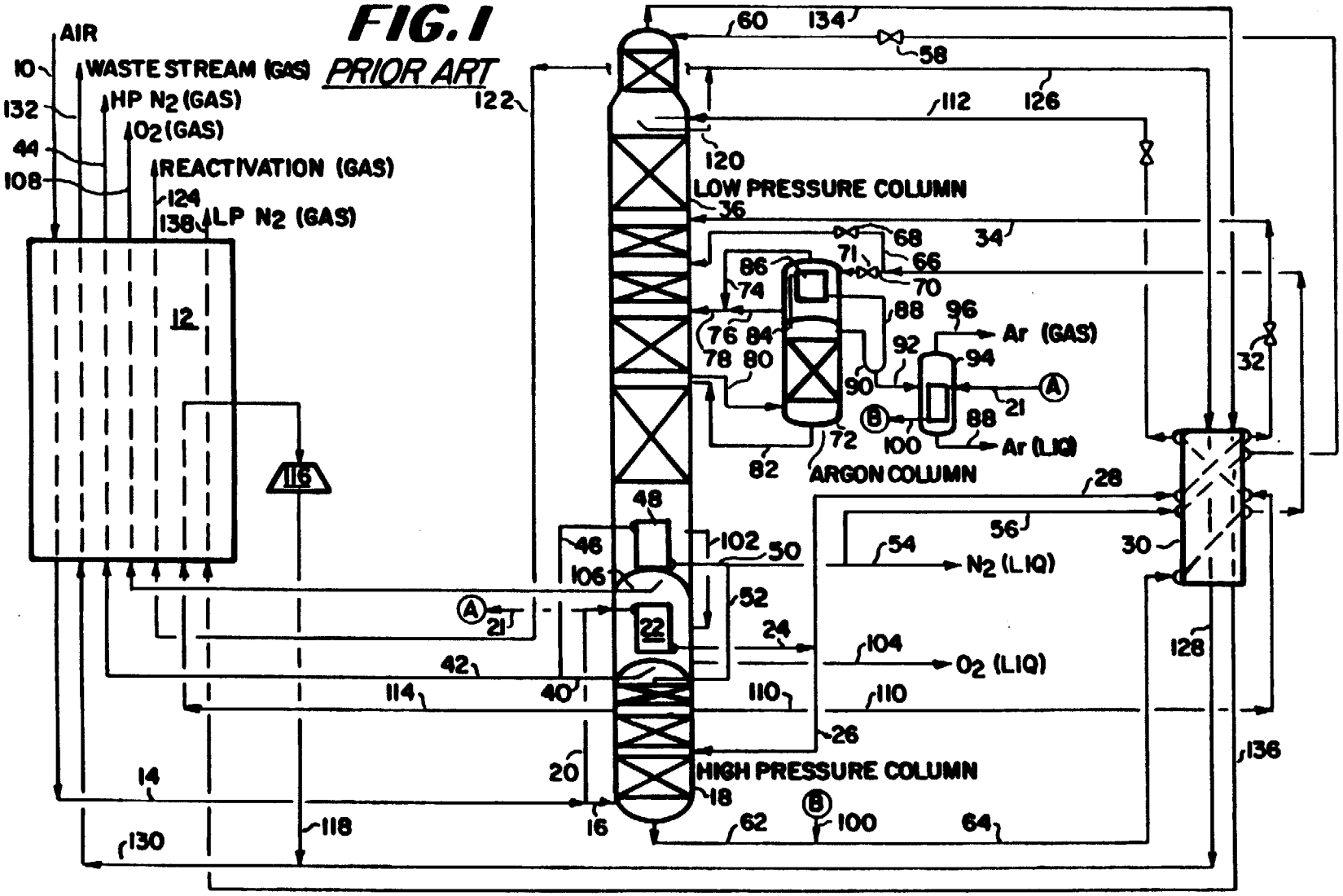
FIG. 1 PRIOR ART
FIG. 1 is a schematic diagram of a typical three column air separation process producing argon and oxygen products.

With reference to FIG. 1, compressed air, which has been cooled to cooling water temperature and has had removed any impurities which may freeze at cryogenic temperatures, e.g. water and carbon dioxide, is fed via line 10 to heat exchanger 12, wherein it is cooled to the stream's dew point. This cooled, compressed, impurity-free air, now in line 14, is then split into two portions.

The first portion is fed via line 16 to a lower location in high pressure column 18. The second portion, in line 20, is further split into two portions. The first portion is fed to argon product vaporizer 94 via line 21 and the second portion is fed to and condensed in product vaporizer 22 to provide boiling of liquid oxygen in the sump surrounding product vaporizer 22, and removed from product vaporizer 22 via line 24. The condensed liquid, in line 24, is then separated into two portions, the first portion which is fed as feed to an intermediate location of high pressure column 18 via line 26 and the second portion, in line 28, which is subcooled in heat exchanger 30 flashed in J-T valve 32 and fed into an intermediate location of low pressure column 36 via line 34.

Overhead is removed from high pressure column 18 via line 40 and then divided into two portions. The first portion is warmed in main heat exchanger 12 to recover refrigeration and then removed as high pressure nitrogen product via line 44. The second portion is fed via line 46 to reboiler/condenser 48 located in the bottom of low pressure column 36 wherein it is condensed and removed via line 50. This condensed pure nitrogen stream is then split into three portions. The first portion is fed via line 52 to the top of high pressure column 18 to provide reflux to high pressure column 18. The second portion is removed as liquid nitrogen product via line 54, and the third portion, removed via line 56, is subcooled in heat exchanger 30, flashed in J-T valve 58 and fed to the top of low pressure column 36 via line 60, to provide a pure nitrogen reflux to the top hat portion of low pressure column 36.

Oxygen-enriched liquid bottoms from high pressure column 18 is removed via line 62. This stream is combined with stream 100, a condensed air stream from argon product vaporizer 94, to form combined oxygen-enriched liquid stream 64. This combined liquid stream is subcooled in heat exchanger 30 and then split into two substreams. The first substream, line 66, is flashed in J-T valve 68 and fed into an upper-intermediate location of low pressure column 36. The second substream, line 70, is flashed in J-T valve 71 and fed to the sump surrounding condenser 86 located at the top *of* argon column 72 to provide refrigeration for condenser 86. A gaseous overhead is removed from the overhead portion of the sump via line 74 and is combined with the liquid removed from the sump via line 76 to form combined stream 78. This combined stream 78 is then fed into an intermediate location of low pressure column 36.

A side stream is removed from a lower-intermediate location of low pressure column 36 via line 80 and fed to a lower portion of argon column 72. The bottoms liquid from argon column 72 is returned to low pressure column 36 at the same location as the side stream 80 draw in order to provide intermediate column reflux. Overhead argon is removed from argon column 72 via line 84, condensed in condenser 86 and split into two portions. The first portion is returned to the top of argon column 72 via line 90 to provide reflux to argon column 72. The second portion is removed and fed via line 92 to argon product vaporizer 94. Argon gas product is removed from product vaporizer 94 via line 96 and argon liquid product is removed from product vaporizer 94 via line 98.

A bottoms liquid stream is removed from low pressure column 36 (the bottom sump surrounding reboiler/condenser 48) and fed to the sump surrounding product vaporizer 22 via line 102. Gaseous oxygen product is removed from the overhead of the sump surrounding product vaporizer 22 via line 106, warmed to recover refrigeration in main heat exchanger 12 and removed as gaseous oxygen product via line 108. A liquid oxygen product is removed from a lower portion of the sump surrounding product vaporizer 22 as liquid oxygen product via line 104.

A liquid side stream is removed via line 110 from an intermediate location of high pressure column 18. This impure liquid side stream is subcooled in heat exchanger 30, reduced in pressure and fed as reflux an upper portion of low pressure column 36 via line 112. In addition, a gaseous side steam is removed via line 114 from a similar location of high pressure column 18. This side stream is warmed in main heat exchanger 12 to recover refrigeration and work expanded in expander 116 to recover refrigeration. This expanded stream is now in stream 118.

A gaseous side stream is removed via line 120 from an upper location of low pressure column 36 and split into two portions. The first portion, in line 122, is warmed in heat exchanger 12 to recover refrigeration, used as reactivation gas and removed from the process via line 124. Reactivation gas is necessary to reactivate a mole sieve adsorption unit which is used to remove water and carbon dioxide from compressed feed air. If reactivation gas is unnecessary, then stream 124 would be vented to the atmosphere as waste. The second portion of the side stream, line 126, is warmed in heat exchanger 30 to recover refrigeration and combined with expanded stream 118 to form combined stream 130. This combined stream 130 is then warmed in heat exchanger 12 to recover any residual refrigeration and vented as waste via line 132.

Finally, an overhead from low pressure column 36 is removed via line 134 and warmed in heat exchanger 30 to recover refrigeration. This warmed overhead, now in line 136, is further warmed in heat exchanger 12 to recover any residual refrigeration and removed as low pressure nitrogen product via line 138.

The distillation columns in the above process would utilize columns with distillation trays. Although dependent upon the selected cycle, product makes, and relative values of power and capital, typical theoretical tray counts for the high pressure column, low pressure column and argon column are; 50, 70 and 40 respectively. Typically, specially designed distillation trays have been used within the columns to effect the separation. These distillation trays are generally designed with a tray spacing ranging from 4 to 8 inches. For large plants, sieve trays are usually used. The hole area is typically 5 to 15% of the tray deck. In an effort to maximize performance for a given pressure drop, try designs which allow multiple weirs on each tray are common. The reduction in liquid invention due to the presence of multiple weirs, results in a loss of point efficiency. An optimized design will typically yield a pressure drop per theoretical stage of separation of from 1.5 to 3.0 inches of liquid per theoretical stage of separation of from 1.5 to 3.0 inches of liquid per theoreticalstage of separation.

A further reduction in the pressure drop per theoretical stage could lower the required outlet pressure of the feed air compressor. This effect is not only important in the high pressure column, but especially important in the low pressure column. This results from the fact that a relatively modest reduction of the bubble point of the reboiling stream will result in a substantial reduction in the required pressure in the top of the high pressure column.

A distillation device which would allow separation with a pressure drop per theoretical stage substantially below that attainable with distillation trays would have substantial value for the cryogenic separation of air.

In the cryogenic industry, one method to reduce the pressure drop per theoretical stage is to increase the open area fraction on the distillation tray. If the open area fraction is increased beyond about 0.20, and the superficial velocity is kept sufficiently low to prevent tray flooding at reasonable tray spacings, substantial weeping will occur. This results in a significant degradation of column performance.

The solution of the present invention is the use of structured or ordered packings. By the term structured or ordered packing, it is meant a packing which will promote liquid and/or vapor mixing in a direction perpendicular to the primary flow direction. Examples of ordered or structured packings are disclosed in U.S. Pat. Nos. [4,128,684;] 4,186,159; 4,296,050; 4,455,339; 4,497,751; 4,497,752 and 4,497,753, the specifications of which are incorporated herein by reference. These patents disclose specific examples of structured (ordered) packings, however, they do not present an exhaustive list of examples. It should be noted that it is not the intention of the present invention to prefer one type of structured packing over another. All types of structured packings are believed to be applicable to the present invention. It should be pointed out that the performance of these packing elements are reasonably well known for hydrocarbon separations, however, no suggestions of this use appear in the art for the cryogenic separation of air.

Since no known data is available for commercial packings for the cryogenic separation of air, the evaluation of using random or ordered packing in the cryogenic distillation of air requires the use of mechanistic models for determining the mass transfer characteristics. Examples of such mechanistic correlations can be found in many texts, e.g. R. E. Treybal, Mass Transfer Operation, Chapter 3.

The development of such a correlation requires experimental data to allow regression of the required constants. Following the general approach given in the Treybal reference, a correlation for the mass transfer behavior of an ordered packing is given by:

$$Sh_g = a_1 Re_g^{x1} Sc_g^{y1}$$

$$Sh_l = a_2 Re_l^{x2} Sc_l^{y2}$$

where:

$$Sh_g = \frac{k_g d_{hg}}{D_g},\ Sh_l = \frac{k_l d_{hl}}{D_l}$$

$$Re_g = \frac{\rho_g v_g D_{hg}}{\mu_g},\ Re_l = \frac{4\Gamma}{\mu_l}$$

$$Sc_g = \frac{\mu_g}{\rho_g D_g},\ Sc_l = \frac{\mu}{\rho_l D_l}$$

where:

Re = Reynolds Number: dimensionless
Sc = Schmidt Number: dimensionless
Sh = Sherwood Number: dimensionless
$d_h$ = characteristic dimension of flow: ft
D = diffusivity: sq ft/sec
k = mass transfer coefficient: lb-mole/(sec)(sq ft)(Δconc)
v = superficial velocity: ft/sec
Γ = mass rate of flow per unit width: lb-mass/(ft)(sec)
μ = viscosity: lb-mass/(ft)(sec)
ρ = density: lb-mass/cu ft subscript g = vapor phase subscript l = liquid phase and $a_1$, $a_2$, $x_1$, $x_2$, $y_1$, and $y_2$ are constants and are obtained from numerical regression of raw data for a particular system.

Values for $k_l$ and $k_g$ are substituted into an intermediate expression for the overall gas phase mass transfer coefficient:

$$\frac{1}{K_y} = \frac{1}{k_y} + \frac{m}{k_x}$$

where:

G = superficial vapor molar flux: lb-mole/(sq ft)(sec)
$K_y$ = overall vapor phase mass transfer coefficient: lb-mole/(sec)(sq ft)(mole fraction)
$k_y = k_g(\rho_g/M_g)$: lb-mole/(sec)(sq ft)(mole fraction)
$k_x = K_l(\rho_l/M_l)$: lb-mole/(sec)(sq ft)(mole fraction)
L = superficial liquid molar flux: lb-mole/(sq ft)(sec)
m = slope of the equilibrium line: dimensionless
M = molecular weight: lb-mass/lb-mole These expressions are used to calculate the height of the overall gas transfer unit: $H_{tOG}$, where:

$$H_{tOG} = \frac{G}{K_y a}$$

where:

$H_{tOG}$ = height of an overall gas transfer unit: ft
a = specific area of a fixed bed of packing: (sq ft)/(cu ft)

and finally the height of packing required to obtain a theoretical stage of separation can be calculated:

$$HETP = H_{tOG} \ln(\lambda)/(\lambda - 1)$$

where:

HETP = height of packing equivalent to a theoretical plate
λ = (M)(G)/L

This approach should be generally valid, and allows the calculation of performance over a wide range of operating conditions and systems with varying properties.

In order to demonstrate the efficacy of the present invention, to provide comparative data for other systems, and to demonstrate the validity of typical mechanistic approaches to mass transfer in a cryogenic separation application, mass transfer data was collected for oxygen/nitrogen and oxygen/argon separations, where the concentrations of the components in the two-component separation systems were varied over a rather wide range.

This mass transfer performance data was generated using two similar apparatuses.

The first apparatus, an eight inch diameter column, was used to develop a portion of the oxygen/nitrogen data and all of the oxygen/argon separation data. The eight inch diameter column is packed with nine feet of structured packing. The apparatus is such that liquid is fed to the top of the column through a nozzle, distributed over the top most layer of the packing and flows downward through the packing matrix. The liquid which drains off the bottom of the packed bed is collected and removed from the column. Vapor is fed to the column through another [nozzel] *nozzle* and distributed by a means of a perforated pipe. The vapor travels up through the packing counter-current to the liquid. The vapor exits through a nozzle at the top of the column. During operation of the apparatus (in a recycle loop mode), overhead vapor from the column flows directly to a condenser. This condenser consists of 5 one-inch i.d. copper tubes which are 44 ft. long coiled inside a liquid nitrogen bath. The pressure of this nitrogen bath controls the condensing temperature and thus the pressure in the column. The condensed vapor from the condenser is fed to the column as liquid. Vapor feed to the column is provided by boiling the liquids removed from the bottom of the column in an electrically heated thermosyphon reboiler. Varying the heat input of the reboiler changes the rate at which vapor is produced. This vapor rate controls the throughput of vapor and liquid within the column.

The second apparatus was used only to generate nitrogen/oxygen separation data. This column was five feet in diameter and is packed with 9.33 feet of structured packing. As with the first apparatus, the liquid enters the top of the column and is distributed over the top most layer of the packing. Vapor enters from directly underneath the packing through a vapor distributor. The liquid and vapor contact each other countercurrently in the same manner as in the first apparatus. The flows in this apparatus were not recycled. The saturated vapor feed was supplied by an external source. The liquid feed supply was also external to the apparatus. These flows were controlled directly by valves in the liquid feed piping and vapor outlet piping.

The data collection was essentially identical for both apparatuses. First, the vapor and liquid flows were adjusted to give the desired rates within the column. Next, the overhead and bottom vapor purity was monitored until the equipment achieved steady state operation, i.e. neither of these purities changed with time. Upon reaching steady state, the overhead and bottoms vapor and liquid compositions were analyzed and the compositions were noted. Knowing the flow rates and composition of all the streams entering and leaving the column, a multicomponent distillation computer simulation was performed. The simulation determined the number of theoretical stages within the column. This value was divided into the total packed height to give the data value for HETP. In order to provide accurate data analysis for the eight (8) inch column, all experiments were run at an L/G ratio of ~1.0.

Figure 2:
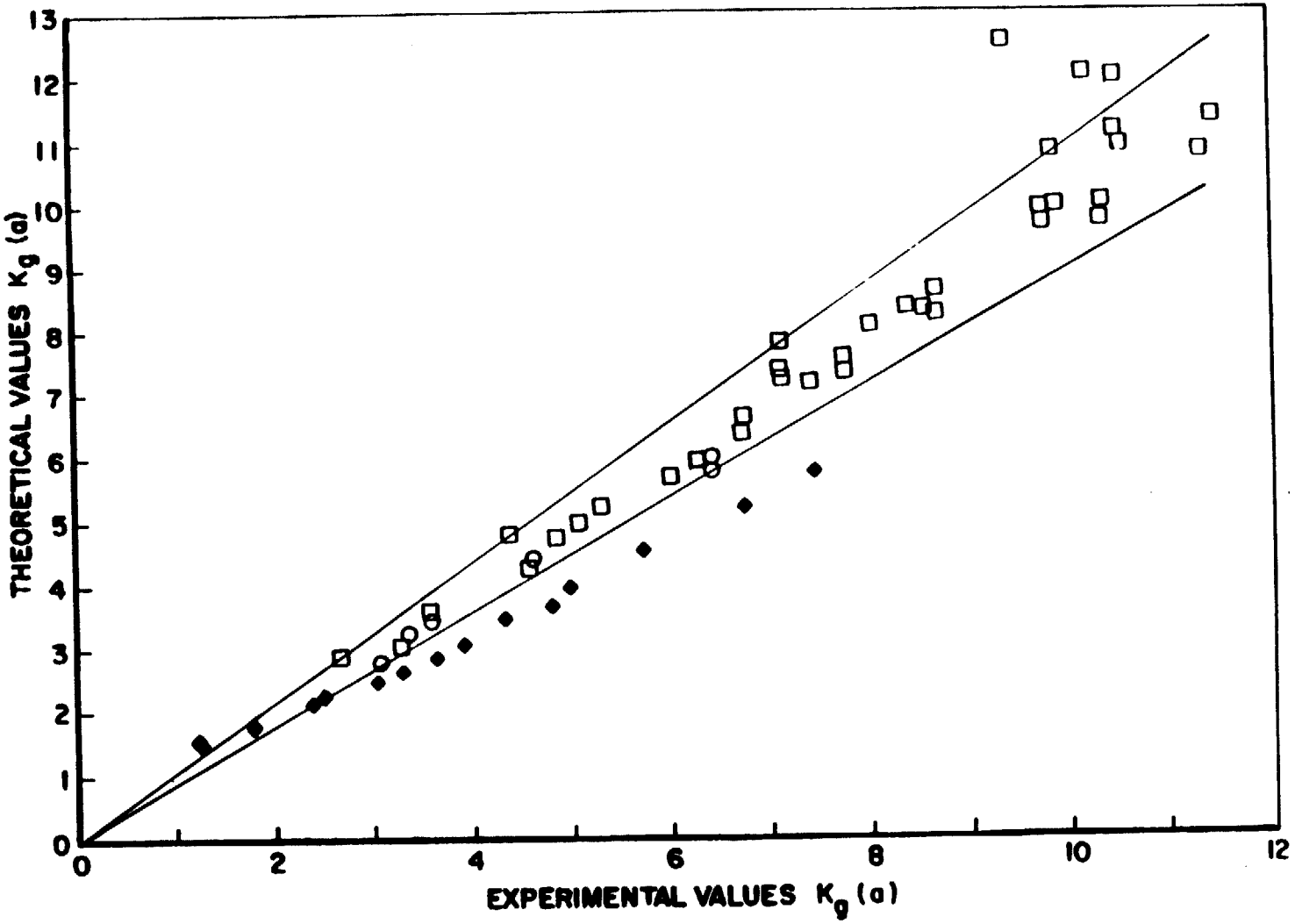
FIG. 2 is a plot of the measured overall gas phase mass transfer coefficient versus the correlation predicted value.

In evaluating the data collected, FIG. 2 compares the overall gas phase mass transfer coefficient ($K_{g\times a}$) predicted by the correlation presented in this application to the measured data. The data in FIG. 2 are divided into three groups: nitrogen/oxygen, wherein the oxygen concentration ranged from 2 vppm to 50 vol %, (illustrated by a square), very high argon/oxygen, wherein the argon concentration ranged from 82.5 to 97 vol %, (illustrated by a circle) and oxygen/argon, wherein argon ranged from 0.6 to 85 vol %, (illustrated by a blackened diamond).

The nitrogen/oxygen data are a compilation of data from an 8 inch diameter column operating at 30 psia and a 5 foot diameter column operating at 18 psia. The compositions of these data ranged from 50 vol % oxygen in nitrogen to 2 vppm oxygen in nitrogen. Since the development of this correlation was based on these data the agreement between the data is, as expected, quite good. The data and correlation generally agree to well within ±10%. The few points at the upper right which exhibit additional scatter and fall above the +10% line are operating at a very high liquid and vapor throughput. These data are unusual for two reasons. First, the large liquid rates were beyond the capacity of the distributor. Thus, the liquid was not distributed properly over the column cross-section. This has been known to cause poor performance in packed columns. Second, the high liquid and vapor rates indicates that operation was conducted very near the flooding point of the column. This causes phenomena such as [backmixing] *back-mixing* of the liquid, entrainment and intrinsic maldistributions within the packing. All of these factors may have contributed to the loss in performance. Operation of a packed column this near its flooding point is usually not done. Therefore, the correlation was based on the fundamental mechanisms which dominate the normal operating range of throughput. Hence, the lack of agreement near the flooding point indicates the validity of the correlation rather than any problems with it. In addition, the correlation accurately predicts the performance over a factor of ~2 change in pressure and a factor of 7.5 in column diameter and for a wide range of compositions.

The argon/oxygen data were measured in the same 8 inch column that was used to generate part of the nitrogen/oxygen data. The composition range of these data is 82.5–97 vol % argon with the remainder oxygen. These data were taken at 30 psia. As shown by the parity plot in FIG. 2, these data agree very well with the correlation. These data are coincident with nitrogen/oxygen data. Since the correlation was not regressed with these data, the excellent agreement indicates that the fundamental mechanisms used in this correlation accurately describes the behavior of these data.

The third set of data presented in FIG. 2 is the oxygen/argon data. These data were taken over the 0.6–85 vol % argon in oxygen concentration range. These data were taken in the same 8 inch column used for the nitrogen/oxygen data and the high concentration argon in oxygen discussed previously. These data clearly exhibit a remarkable improvement in performance over all the other data. In general, most of the data values are more than 10% better than the expected values from the correlations. In addition, the data exhibit a markedly different slope than all of the other data. This is another indication that there is some additional mechanism which enhances the mass transfer performance in this range of argon concentrations in oxygen. This enhancement appears to increase as the throughput in the column increases.

Returning to the correlation and the calculation of HETP's, a regression of the data for nitrogen-oxygen system gives the following values for the required constants.

| | |
|---|---|
| $a_1 = 0.0295$ | $a_2 = 0.052$ |
| $x_1 = 0.893$ | $x_2 = 1.19$ |
| $y_1 = 0.33$ | $y_2 = 0.33$ |

The values for HETP calculated from this correlation for the nitrogen-oxygen system range from 10 to 12 inches.

Additional data, taken with argon/oxygen mixtures with concentrations of 82.5–97 vol % argon yield HETP values from 7.6 to 8.2 inches. Again, predictions using the correlation based on the nitrogen/oxygen data base are from 7.6 to 8.2 inches. The agreement of the predictions from the nitrogen/oxygen based correlation with this high argon content data base clearly shows the general applicability of this type of mechanistically based correlation.

The above calculated values of HETP, in addition to the large number of required theoretical stages clearly show that the use of the tested structured packing would require columns with substantial increase in column height over that possible with a trayed column. This will result in a substantial capital penalty when compared to columns utilizing conventional cryogenic distillation trays.

Figure 3:
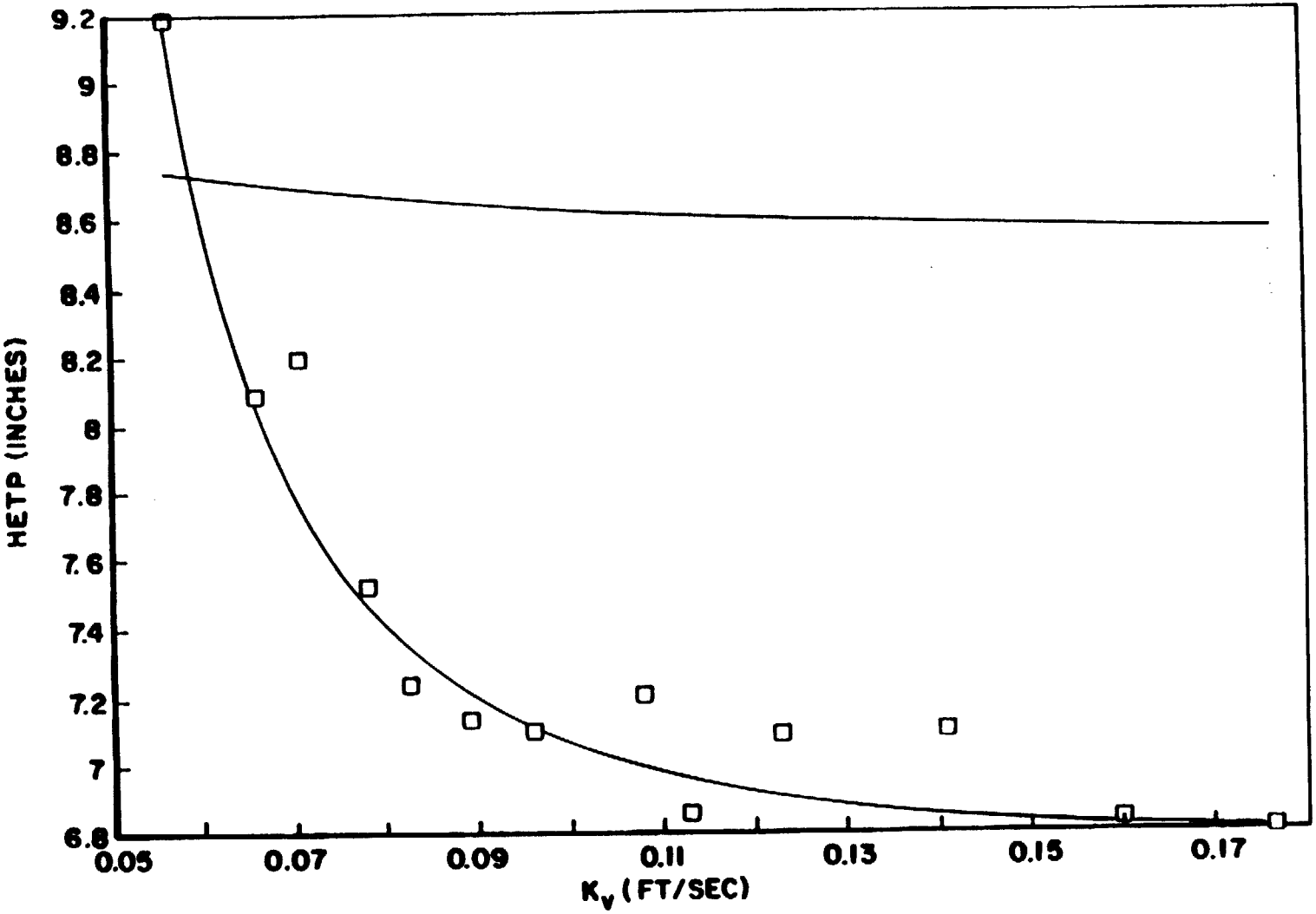
FIG. 3 is a plot of the height equivalent to a theoretical plate versus the densimetric superficial gas velocity for oxygen/argon separations.

On the other hand, tests separating oxygen from argon where the argon content was between 85% and 0.6% have shown a remarkable and unexpected enhancement in separation performance. For example, the HETP can be as low as 6.8 inches, when the expected (predicted) value is 8.5 inches. FIG. 3 more clearly shows the remarkable enhancement of the mass transfer for the oxygen/argon data. FIG. 3 plots the HETP data for the high oxygen concentration data versus $K_v$. $K_v$ is the densitmetric superficial gas velocity in the column and is calculated by:

$$K_v = v_g[\rho_g/(\rho_l - \rho_g)]^{0.5}$$

where:

$v_g$ = superficial gas velocity: ft/sec

Also plotted is the expected HETP calculated from the correlation. These calculated values correspond to what would be expected for the HEPT based on all the other available cryogenic data. As illustrated by the plot, the measured HETP data values are significantly lower than the expected values at $K_v$ greater than 0.06 ft/sec. In fact, the enhancement appears to generally increase with increasing $K_v$. This enhancement may be due to an increase in interfacial area or an unexplained reduction in liquid phase resistance for this range of concentrations.

As can be seen from the above experiments, there is an overlap in ranges of argon concentration for the two argon/oxygen data sets. In one data set the argon concentration is between 0.6 and 85 vol % and in the other, between 82.5 and 97 vol %. For the first data set, a distinct benefit of using a structured packing is seen; this benefit is the fact that the height required for structured packings are comparable to the height for distillation trays to achieve the same overall separation while retaining the lower pressure drop advantages. For the second data set, the heights using structured packing will exceed the height required for distillation trays for the same overall separation. When dealing with this overlap region, it is important to note that because the experimental apparatus did not have the capability to accurately analyze the compositions of the liquid and vapor phases at intermediate locations in the column and because the concentration with height produced by a packed column is continuous rather than stepwise as for tray columns, only overall HETP's could be calculated with any sense of confidence. It is believed that there is a transition point in the argon concentration where the unexpected benefit of lower HETP's is no longer seen. This transition is believed to be somewhere between 75 and 85 vol % argon. Therefore, the present invention embodies the use of an ordered (structured) packing in at least those regions of the distillation column system where the argon concentration can be in the range of 0.6% to 75% argon by volume. This measured, unexpected improvement exists for values of $K_v$ exceeding about 0.06 ft/sec. At values of $K_v$ less than 0.06 ft/sec, measured HETP values do not exceed anticipated values.

Any attempt to manipulate the constants within the correlations so that the predictions would agree with the data causes the correlation to severely underpredict the HETP's for the other systems. This further substantiates the observation that there is a significant enchancement of performance within the composition range of 75% to 0.6% argon in oxygen/argon separation.

Another reason that correlations fail to predict mass transfer phenomena well is that they are used for systems where the key physical transport properties differ substantially from the systems used to develop the correlation. The correlation fails because it is being used in a region of extrapolation beyond the data base used to generate the correlation. Therefore, if this were true for oxygen/argon at low concentrations of argon, one would expect [thef] *the* basic physical properties of oxygen to be substantially different from either nitrogen or argon. In Table I, the physical properties of saturated vapor and liquid for nitrogen, oxygen and argon are listed. All the values for oxygen are comparable to the values for nitrogen and argon. Therefore, a significant property difference causing a correlation error for oxygen-rich compositions is not evident.

TABLE I

Key Transport Properties of $N_2$, $O_2$, Ar

| | $N_2$ | $O_2$ | Ar |
|---|---|---|---|
| Saturated Liquid | | | |
| Density: lb-m/cu ft | 48.4 | 75.6 | 83.0 |
| Viscosity × $10^4$: lb-m/(ft)(sec) | 0.7 | 1.07 | 1.1 |
| Diffusivity × $10^8$: sq ft/sec | 8.6 | 7.4 | 7.5 |
| Surface Tension × $10^4$: lb-m/ft | 5.1 | 7.85 | 7.1 |
| Saturated Vapor | | | |
| Density: lb-m/cu ft | 0.359 | 0.621 | 0.685 |
| Viscosity × $10^6$: lb-m/(ft)(sec) | 3.9 | 5.3 | 5.5 |
| Diffusivity × $10^5$: sq ft/sec | 1.15 | 1.34 | 1.31 |

Table II gives (for the subsets of data) the range of values for the dimensionless groupings. The oxygen-rich data do not fall outside the ranges for the nitrogen-rich and argon-rich data subsets. Therefore, the oxygen-rich data subset clearly [faoos] *falls* within the range of the correlation. This further supports the unexpected nature of this phenomena.

TABLE II

Range of Dimensionless Grouping

| | Nitrogen-Rich | Argon-Rich | Oxygen-Rich |
|---|---|---|---|
| $Sh_l$ | 24–143 | 51–119 | 27–78 |
| $Sh_g$ | 15–67 | 36–69 | 20–95 |
| $Re_l$ | 48–356 | 148–300 | 93–358 |
| $Re_g$ | 1600–6500 | 2900–5900 | 1600–5800 |
| $Sc_l$ | 23–17 | 18 | 19 |
| $Sc_g$ | 0.60 | 0.61 | 0.63 |

Established and fundamentally sound correlation methods have predicted values for HETP between 8.5 and 12 inches for the cryogenic distillation of air. Since the regions where oxygen/argon separations occur usually requires a large number of theoretical stages, a significant capital penalty has been associated with using ordered packing in this application. Undoubtedly, this significant capital penalty has contributed to the lack of use of order packing in oxygen-rich regions of distillation columns. This new discovery allows cryogenic air separation plants to be designed with HETP's which are comparable to distillation trays in areas where the argon content is less than 75%. This will substantially reduce the capital cost associated with using ordered packing and allow the benefits of its reduced pressure drop to be fully realized.

To demonstrate the energy savings benefit of the present invention, an analysis has been done which calculates the improvement in the total power consumption of a cryogenic air separation plant as the pressure drop per theoretical stage in the column system is reduced. For this discussion the column system can be broken down into two parts, the high pressure column and the low pressure column-argon column combined system. Reducing pressure drop in the high pressure column obviously reduces the discharge pressure of the air compressor feeding the plant. A reduction of pressure drop in this area leads to substantial but not overwhelming power saving. The reason is that the high pressure column, by necessity of the cycle, operates at near 100 psia. The pressure drop of a well designed trayed high pressure column ranges from 2 to 3 psi. Since power is generally inversely proportion to the log of the pressure ratio, a total elimination of the pressure drop in the high pressure column would reduce the power by about 2.6%.

However, a reduction in the pressure drop within the low pressure column-argon column system can result in power savings on the order of 6% depending on which cycle is used. The reason for this is twofold. First, there are nearly twice as many theoretical stages in the low pressure column/argon column system as are in the high pressure column. Therefore, a reduction in the pressure drop per theoretical stage has a much greater impact in the low pressure-argon column system than in the high pressure column. Secondly, the pressure drop in the low pressure column directly controls the pressure and thus the bubble point of the reboiling stream. Since all the product must be discharged at or above atmospheric pressure the pressure in the reboiling stream is:

$$P_{atm} + \Delta P_{out} + \Delta P_{LPC} = P_{R/B}$$

where:

$\Delta P_{out}$ = pressure drop for overhead products leaving the plant $\Delta P_{LPC}$ = pressure drop within the low pressure column $P_{atm}$ = ambient atmospheric pressure $P_{R/B}$ = pressure of the reboiling stream Because this stream is reboiled by condensing vapor in the high pressure column the bubble point of this stream and the temperature approach at the top of the heat exchanger set the [dewpoint] *dew point* of the condensing stream. Therefore, the high pressure column pressure is set by the pressure at which the vapor at the top of the high pressure column will condense at this specified dewpoint. The relationship between pressure and dewpoint in the condensing stream causes approximately a tripling of any pressure change in the reboiling stream.

Simply stated, for every 1 psi change in the pressure at the bottom of the low pressure column the high pressure column pressure changes by about 3 psi. Thus, reducing the pressure drop in the low pressure column can dramatically reduce the high pressure column pressure. This, in turn, will effect a comparable reduction in power consumption. For an 800 TPD high purity oxygen plant, for distillation trays the pressure drop per theoretical stage would be ~0.07 psi/stage. Experiments indicate that ordered packings would use, on average, 0.008 psi/stage. This would result in a power savings of 8%.

The present invention has been described with reference to some specific embodiments thereof. These embodiments should not be considered a limitation on the scope of the invention, such scope being ascertained by the following claims.

We claim:

[1. In a process for the separation of mixtures, which comprise oxygen, nitrogen, and argon, by cryogenic distillation, wherein in certain regions of a distillation column system having at least one column, a liquid phase stream containing oxygen, argon and nitrogen, and a vapor phase stream containing oxygen, argon and nitrogen, are intimately contacted thereby allowing mass transfer which enriches the liquid phase stream with oxygen and strips argon from the liquid phase stream, and enriches the vapor phase stream with argon and strips oxygen from the vapor phase stream, the improvement comprising effectuating intimate contact of the liquid and vapor phase streams utilizing a structured packing in at least those regions of the distillation column system where argon concentration is within the range from about 0.6 to about 75 volume percent, and operating the process such that the densimetric superficial gas velocity in those regions is at least 0.06 feet per second.]

[2. The process of claim 1 wherein the mixture is air.]

[3. In a process for the separation of mixtures, which comprise oxygen and argon, by cryogenic distillation, wherein in certain regions of a distillation column system having at least one column, a liquid phase stream containing oxygen and argon, and a vapor phase stream containing oxygen and argon, are intimately contacted thereby allowing mass transfer which enriches the liquid phase stream with oxygen and strips argon from the liquid phase stream, and enriches the vapor phase stream with argon and strips oxygen from the vapor phase stream, the improvement comprising effectuating intimate contact of the liquid and vapor phase streams utilizing a structured packing in at least those regions of the distillation column system where argon concentration is within the range from about 0.6 to about 75 volume percent, and operating the process such that the densimetric superficial gas velocity in those regions is at least 0.06 feet per second.]

[4. A method for improving a cryogenic distillation apparatus having at least one distillation column for the separation of mixtures containing oxygen and argon, comprising the step of replacing the distillation trays with a structured packing in at least those regions of the distillation column system where the concentration of argon is in the range from about 0.6 to about 75 volume percent.]

*5. A process for the separation of mixtures, which comprise oxygen and argon, by cryogenic distillation, wherein, in a distillation column system having at least one column, a liquid phase stream containing oxygen and argon and a vapor phase stream containing oxygen and argon are inti-*

*mately contacted in at least one region of the distillation column system where argon concentration is within the range from 0.6 to 75 volume percent, thereby allowing mass transfer which enriches the liquid phase stream with oxygen and strips argon from the liquid phase stream, and enriches the vapor phase stream with argon and strips oxygen from the vapor phase stream, characterized in that intimate contact of said liquid and vapor phase streams in said region is effected utilizing a structured packing and the densimetric superficial gas velocity in said region is at least 0.06 feet per second (1.8 cm/sec).*

*6. A process as claimed in claim 5, wherein said mixture to be separated further comprises nitrogen.*

*7. A process as claimed in claim 6, wherein said mixture is air.*

*8. A process as claimed in claim 7, wherein the distillation column system comprises a high pressure column, a low pressure column and an argon column and said region is in the low pressure column.*

*9. A process as claimed in claim 7, wherein there is more than one region having said argon concentration and all of said regions utilize structured packing and operate within said densimetric superficial gas velocity range.*

*10. A process as claimed in claim 7, wherein the structural packing is limited to the said region(s) in which the argon concentration is in the range 0.6 to 75 volume percent and the densimetric superficial gas velocity is at least 0.06 feet per second (1.8 cm/sec).*

*11. A process as claimed in claim 6, wherein there is more than one region having said argon concentration and all of said regions utilize structured packing and operate within said densimetric superficial gas velocity range.*

*12. A process as claimed in claim 6 for the separation of a mixture comprising oxygen, nitrogen, and argon, wherein the distillation column system is an integrated multi-column distillation system having a low pressure column and an argon sidearm column integrally communicating with the low pressure column and said regions are in the low pressure column and the argon sidearm column.*

*13. A process as claimed in claim 12, wherein the integrated multi-column distillation system is a three column distillation system comprising a high pressure column in addition to the lower pressure column and the argon sidearm column.*

*14. A process as claimed in claim 13, wherein the high pressure column is packed with a structured packing.*

*15. A process as claimed in claim 6, wherein the structural packing is limited to the said region(s) in which the argon concentration is in the range 0.6 to 75 volume percent and the densimetric superficial gas velocity is at least 0.06 feet per second (1.8 cm/sec).*

*16. A process as claimed in claim 5, wherein there is more than one region having said argon concentration and all of said regions utilize structured packing and operate within said densimetric superficial gas velocity range.*

*17. A process as claimed in claim 5, wherein the structural packing is limited to the said region(s) in which the argon concentration is in the range 0.6 to 75 volume percent and the densimetric superficial gas velocity is at least 0.06 feet per second (1.8 cm/sec).*

*18. The use of structured packing to reduce the HETP (height of packing equivalent to a theoretical plate) in a region of a distillation column system separating oxygen and argon by intimately contacting a liquid phase stream containing oxygen and argon, and a vapor phase stream containing oxygen and argon at an argon concentration within the range from 0.6 to 75 volume percent and a densimetric superficial gas velocity of at least 0.06 feet per second (1.8 cm/sec).*

* * * * *